United States Patent [19]
Rosman

[11] 3,747,467
[45] July 24, 1973

[54] RIVET FASTENER SYSTEM AND METHOD

[76] Inventor: Irwin E. Rosman, 23710 Clarrendon Street, Woodland Hills, Calif. 91364

[22] Filed: May 20, 1971

[21] Appl. No.: 145,191

Related U.S. Application Data

[63] Continuation-in-part of Ser. No. 15,363, March 2, 1970, abandoned, which is a continuation-in-part of Ser. No. 755,994, Aug. 28, 1968, abandoned, which is a continuation-in-part of Ser. No. 688,416, Dec. 6, 1967, Pat. No. 3,426,641.

[52] U.S. Cl. .................... 85/37, 29/509, 29/522
[51] Int. Cl. ... B21d 39/00, B23p 11/02, F16b 19/04
[58] Field of Search ............... 85/37, 7; 29/509, 29/522, 526, 512; 287/189.36 D

[56] References Cited
UNITED STATES PATENTS

| | | | |
|---|---|---|---|
| 251,788 | 1/1882 | Marker | 85/37 |
| 1,228,239 | 5/1917 | Phillips | 85/37 |
| 2,302,967 | 11/1942 | Marsh | 29/509 |
| 2,410,398 | 10/1946 | Williams et al. | 85/37 |
| 2,482,391 | 9/1949 | Webster | 85/37 |
| 3,426,641 | 2/1969 | Rosman | 85/37 |
| 3,526,032 | 9/1970 | Pipher | 29/509 |
| 3,551,015 | 12/1970 | Whiteside et al. | 85/37 X |
| 3,561,102 | 2/1971 | Diemer | 85/37 X |

FOREIGN PATENTS OR APPLICATIONS

| | | | |
|---|---|---|---|
| 192,194 | 10/1957 | Austria | 85/37 |
| 679,962 | 8/1939 | Germany | 85/37 |
| 691,273 | 5/1940 | Germany | 85/37 |
| 707,103 | 6/1941 | Germany | 85/37 |
| 17,569 | 11/1889 | Great Britain | 85/37 |

Primary Examiner—Ramon S. Britts
Attorney—Robert E. Geauque

[57] ABSTRACT

A rivet fastener system and method which controls the interference fit of the upset shank of a rivet in structural sheets, the rivet having a crowned, (dome shaped) manufactured head of selected volume at one end of its shank, and a forming collar around the opposite, upset head end of the shank. A substantially uniform interference fit gradient of the required magnitude is obtained to provide extended fatigue life of the structure at the joint.

32 Claims, 24 Drawing Figures

PATENTED JUL 24 1973 3,747,467

IRWIN E. ROSMAN
INVENTOR.

BY R. E. Geauque
ATTORNEY

5/16" Ti RIVET  0.412" AL. PANELS
Ti COLLAR

IRWIN E. ROSMAN
INVENTOR

BY R.S. Geangue
ATTORNEY

1/4 DIA. RIVET TITANIUM ALLOY
SHEET ALUMINUM ALLOY 1D GRIP

IRWIN E. ROSMAN
INVENTOR.

BY R.E. Granger
ATTORNEY

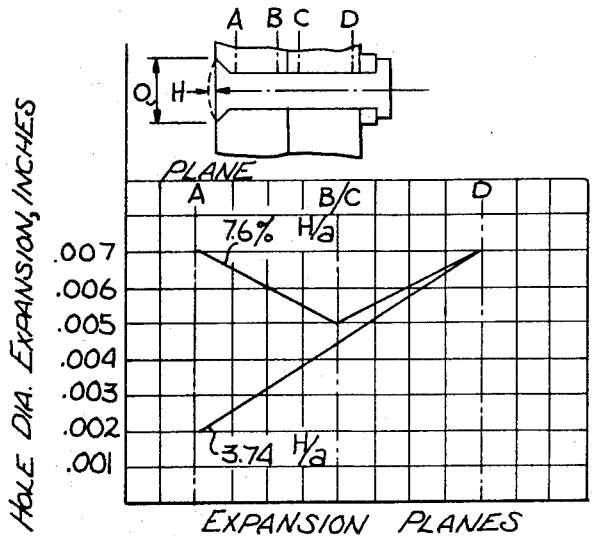
*Fig. 5c*
FLUSH HEAD-DOME TYPE
1/4 DIA. RIVET-TITANIUM ALLOY,
SHEET ALUM. ALLOY, 4D GRIP.
*Fig. 5e*
| SHANK DIA. | GRIP RANGE G.MIN. | G.MAX. | APPROX. G/D MAX. | MIN PROTRUSION | NOM PROTRUSION | NOM P/D |
|---|---|---|---|---|---|---|
| 5/32 | .126 | .156 | 1.0 | .134 | .150 | .925 |
|  | .595 | .625 | 4.0 | .193 | .209 | 1.280 |
| 3/16 | .157 | .188 | 1.0 | .169 | .185 | .974 |
|  | .720 | .750 | 4.0 | .232 | .248 | 1.310 |
| 1/4 | .189 | .250 | 1.0 | .208 | .239 | .960 |
|  | .939 | 1.000 | 4.0 | .280 | .311 | 1.250 |
| 5/16 | .251 | .312 | 1.0 | .253 | .284 | .91 |
|  | 1.189 | 1.250 | 4.0 | .343 | .374 | 1.20 |
| 3/8 | .313 | .375 | 1.0 | .310 | .341 | .91 |
|  | 1.439 | 1.500 | 4.0 | .400 | .431 | 1.15 |
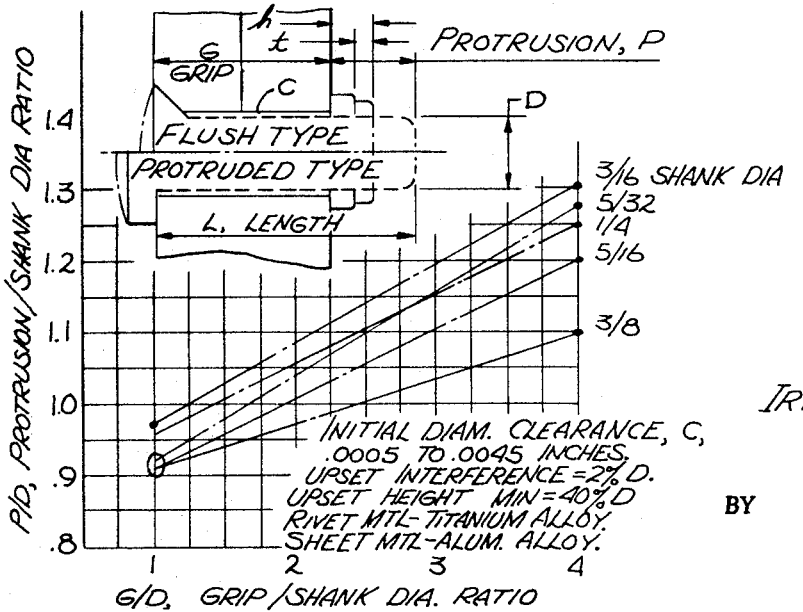
*Fig. 5d*
IRWIN E. ROSMAN
INVENTOR
BY R. E. Geangue
ATTORNEY

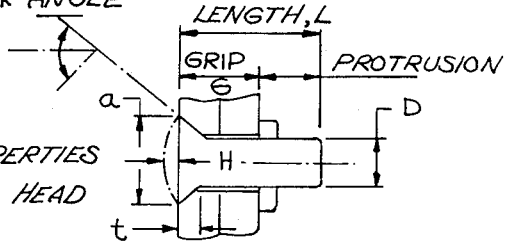

OPTIMIZED DIMENTIONAL PROPERTIES OF DEVELOPED FLUSH, DOME HEAD RIVET-COLLAR SYSTEM

| | 70% C'SNK HEAD (DOMED) | | | | LENGTH REQMTS | | | | 100° C'SNK HEAD (DOMED) | | | |
|---|---|---|---|---|---|---|---|---|---|---|---|---|
| SHANK DIA. D, IN. | HEAD DIA. a IN. | HEAD RATIO a/D | DOME H.T. H, IN. | DOME RATIO % H/a | MAX GRIP G INCHES | GRIP RATIO G/D | MAX RIVET LENGTH L.INCHES | L/D RATIO | HEAD DIA a, INCHES | DOME HT. H. IN. | DOME HT. RATIO % H/a | HEAD RATIO a/D |
| 3/8 (.375) t=.096 t/D=.025 | .509 | 1.36 | .0174 .0214 .0250 .0290 | 3.45 4.36 4.95 5.78 | .560 .812 1.125 1.500 | 1.50 2.16 3.00 4.00 | .904 1.178 1.520 1.929 | 1.30 To 2.40 3.15 4.06 5.15 | .5604 | .0200 .0250 .0290 .0330 | 3.48 4.45 5.09 5.89 | 1.49 |
| 5/16 (.312) t=.086 t/D=.028 | .432 | 1.38 | .0104 .0164 .0230 .0287 | 2.40 3.78 5.30 6.65 | .438 .688 .938 1.250 | 1.40 2.20 3.00 4.00 | .711 .988 1.271 1.622 | 1.20 To 2.25 3.15 4.05 5.15 | .4739 | .0160 .0220 .0270 .0310 | 3.38 4.64 5.70 6.56 | 1.52 |
| 1/4 (.250) t=.075 t/D=.030 | .355 | 1.42 | .0133 .0170 .0214 .0270 | 3.74 4.78 6.00 7.60 | .375 .501 .750 1.000 | 1.50 2.25 3.00 4.00 | .606 .813 1.025 1.307 | 1.34 To 2.42 3.25 4.07 5.25 | .3948 | .0130 .0180 .0230 .0280 | 3.30 4.56 5.85 7.10 | 1.58 |
| 3/16 (.190) t=.056 t/D=.0295 | .268 | 1.41 | .0100 .0128 .0161 .0203 | 2.68 4.76 6.00 7.60 | .281 .406 .562 .750 | 1.50 2.16 3.00 4.00 | .470 .612 .789 1.002 | 1.20 To 2.50 3.25 4.20 5.30 | .3016 | .0110 .0150 .0190 .0230 | 3.66 5.00 6.32 7.66 | 1.66 |
| 5/32 (.163) t=.045 t/D=.0276 | .226 | 1.39 | .0090 .0120 .0150 .0180 | 4.00 5.30 6.65 8.00 | .250 .375 .500 .656 | 1.50 2.25 3.00 4.00 | .397 .540 .685 .865 | 1.20 To 2.43 3.31 4.20 5.30 | .2612 | .0106 .0134 .0168 .0220 | 3.84 5.15 6.45 7.68 | 1.60 |

*Fig.5f*

IRWIN E. ROSMAN
INVENTOR

BY R.S. Grangue
ATTORNEY

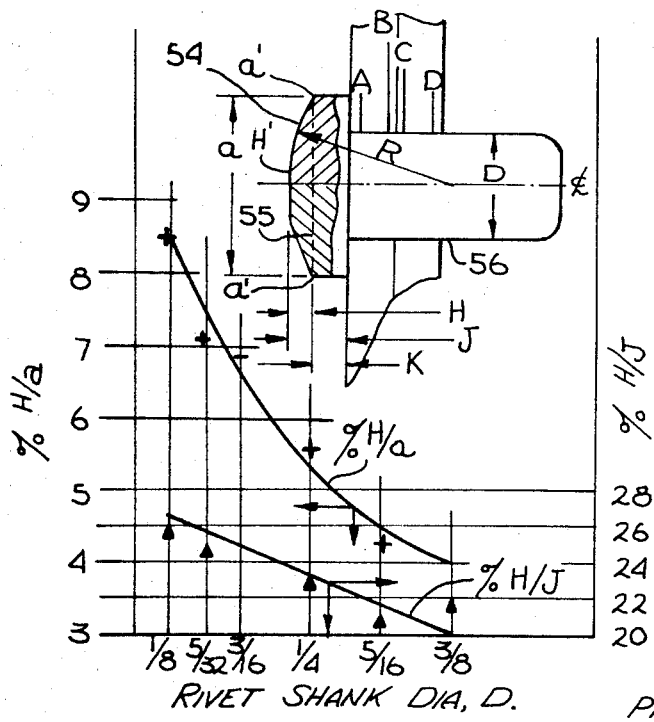
Fig. 7
Fig. 8
PROTRUDED HEAD
| SHANK DIA, D | J | a | a/D | H | %H/a | %H/J |
|---|---|---|---|---|---|---|
| 5/32 (.163) | .072 | .250 | 1.53 | .0178 | 7.10 | 24.5 |
| 3/16 (.190) | .075 | .290 | 1.53 | .0198 | 6.85 | 26.5 |
| 1/4 (.250) | .094 | .380 | 1.52 | .0215 | 5.65 | 23.0 |
| 5/16 (.312) | .098 | .475 | 1.52 | .020 | 4.28 | 20.7 |
| 3/8 (.375) | .105 | .575 | 1.53 | .023 | 4.00 | 21.9 |
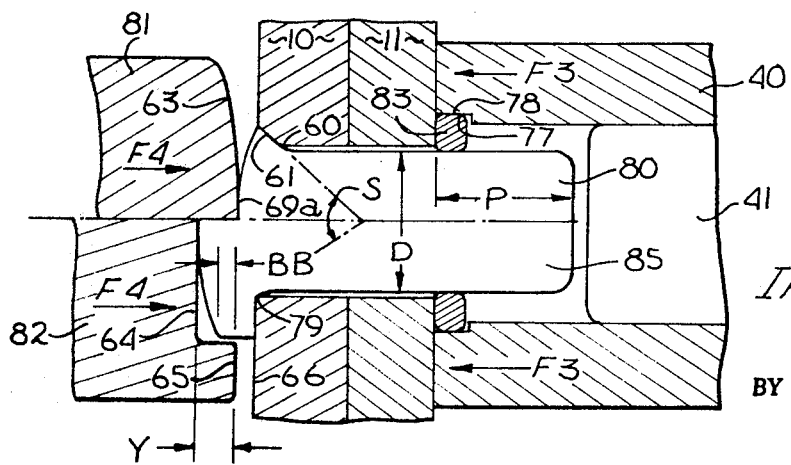
Fig. 9a
IRWIN E. ROSMAN
INVENTOR.
BY R.E. Geangue
ATTORNEY

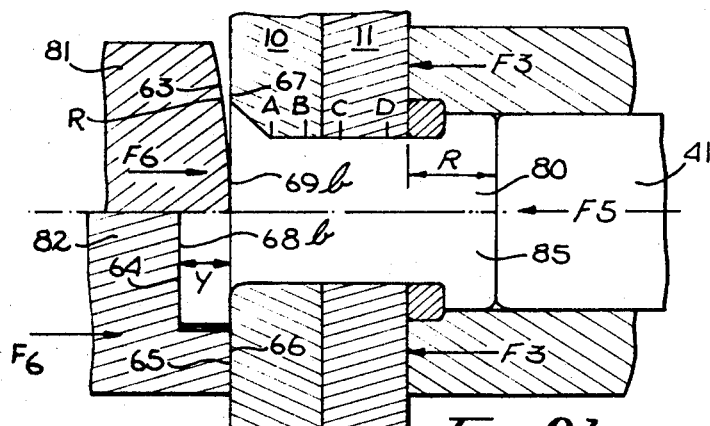
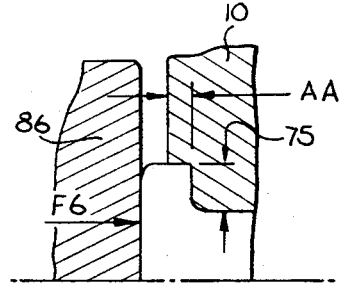
Fig. 9b
Fig. 9c
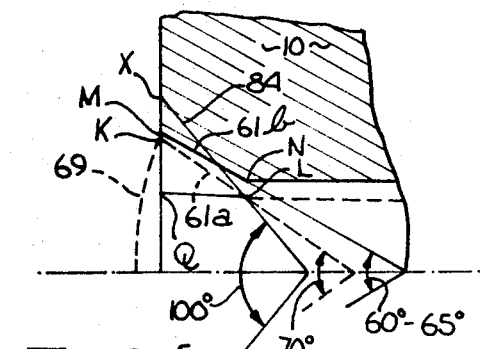
Fig. 9d
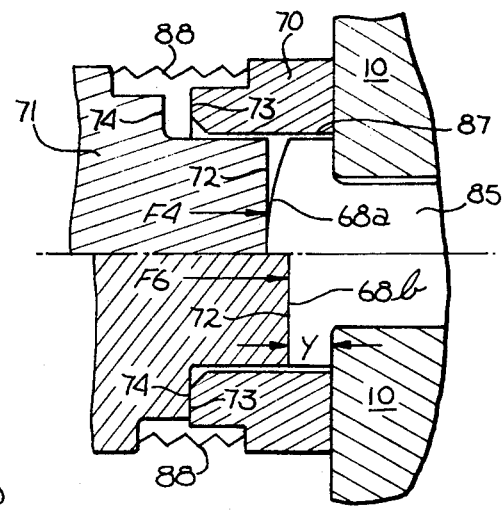
Fig. 10
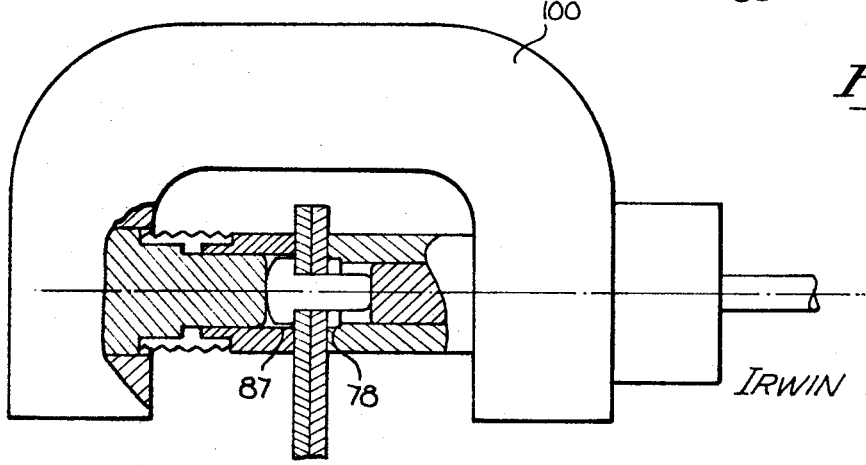
Fig. 11
Irwin E. Rosman
INVENTOR.

RIVET FASTENER SYSTEM AND METHOD

This application is a continuation-in-part of U.S. application Ser. No. 15,363, filed Mar. 2, 1970, by Irwin E. Rosman, now abandoned, which in turn is a continuation-in-part of U.S. application Ser. No. 755,994, filed Aug. 28, 1968, by Irwin E. Rosman, now abandoned, which in turn is a continuation-in-part of U.S. application Ser. No. 688,416, filed Dec. 6, 1967, by Irwin E. Rosman, now U.S. Pat. No. 3,426,641, granted Feb. 11, 1969.

BACKGROUND OF THE INVENTION

1. Field of the Invention

It has been found by fatigue testing of riveted structural sheets, that extended fatigue life of the structure can be obtained when the interference fit of the upset shank in the hole (hole expansion) is within certain prescribed limits. This interference fit pre-stresses the hole, and by so doing decreases the maximum to minimum cyclic stress range in the structure around the hole when cycling loading is applied. This substantially extends the fatigue life of the structure beyond that having a clearance fit or slight interference fit hole. Conversely, it has also been found that too high an interference pre-stress reduces fatigue life.

The optimum range of interference fit values should exist all along the hole axis in order to be effective. If a high interference gradient exists from the manufactured head end to the upset head end of the riveted joint, the interference may undesirably fall outside of the optimum range at each or either end of the joint. Conventional riveting does not provide positive control of the interference fit at each end to obtain a substantially uniform gradient along the axial length of the hole in the structure.

2. Description of the Prior Art

In the conventional type joint, a rivet with a preformed head at one end is inserted through the hole in the structural members to be joined and is upset freely at the other end to complete the joint. In such a conventional type joint, particularly if the rivet material is substantially stronger than that of the sheet, a large expansion gradient, having little expansion at the preformed head (front) end and too much at the upset (back) end results in poor fatigue life of the structural joint. Increasing the upset force in order to increase the expansion of the rivet shank and interference at the front end to an acceptable minimum, will only further increase the interference at the back end, dramatically reducing the fatigue life in the back end region. Such gradients also distort structural panels into an arc along the line of rivets (bow distortion); this not only induces considerable "built-in" bending stresses in the structure, but presents serious assembly joining problems as well.

SUMMARY OF THE INVENTION

The rivet fastener system and method of the present invention controls the hole expansion along its length during upset to maximize the fatigue life of the structure, and to minimize bow distortion of the panels being joined. The rivet has a crowned preformed (manufactured) head of selected volume, which when compressed during rivet upset, causes material to be displaced, thereby expanding the hole at the front end a desired amount. Control of the expansion at the back (upset) end to that substantially equal to that at the front (preformed) end is obtained by the use of a restrained, forming collar. The utilization of a forming collar at the upset end of a rivet to restrain and control plate hole swelling is fully described in aforesaid U.S. Pat. No. 3,426,641. By so controlling and matching the expansion at both ends of the hole, the required expansion along the axis of the hole within the desired limits is obtained.

This invention relates to a rivet fastener system and method which is used in structural joining to achieve high fatigue life such as required in aircraft structure and relates generally to those rivet sizes and sheet thickness utilized in aircraft structure.

It is therefore a primary object of this invention to provide a rivet fastener system and method which can provide controlled upset of the rivet shank within the optimum range of interference fit throughout the axial length of the hole axis in order to pre-stress the sheet material around the hole such that extended fatigue life is obtained.

Another object of the invention is to provide a preformed rivet head configuration having a selected crowned volume which provides material for expanding the hole at the preformed end an amount substantially equal to that at the upset head end, such amount required to produce extended fatigue life and to minimize bow distortion of the structure.

Other objects will be readily apparent from the accompanying description and drawings.

BRIEF DESCRIPTION OF THE DRAWINGS

FIG. 1b is a perspective view of a structural panel assembly showing the curvature or bow distortion induced as a result of the expansion gradient obtained with conventional rivets of FIG. 1a;

FIG. 5c is a graphical illustration of hole expansion using different crown volumes of a flush type rivet head;

FIG. 5d is a graphical illustration showing the relationship between rivet shank protrusion and sheet material thickness;

FIG. 5e is a tabulation of values used in plotting the graphs of FIG. 5d;

FIG. 5f is a tabulation showing the relationship of "dome height" with "rivet length to diameter" ratio for different shank sizes;

FIG. 7 is a graphical illustration showing the relationship between protruded head dimensional ratios and rivet shank diameter;

FIG. 8 is a tabulation of protruded head dimensions for different rivet shank diameters;

FIG. 9a is a combination view of a flush head and protruded head rivet of preferred configuration before rivet upset;

FIG. 9b is a view similar to FIG. 9a after rivet upset;

FIG. 9c is a partial view of a protruded head rivet after rivet upset;

FIG. 9d is a partial view illustrating the cold working of the countersink area of the sheet as a result of domed head upset;

FIG. 10 is a combination view before and after rivet upset illustrating a special die for upset control of a protruded head;

FIG. 11 is a view showing locating means for a portable squeeze tool for upsetting a protruded head rivet.

DESCRIPTION OF THE PREFERRED EMBODIMENT

Figure 1A:
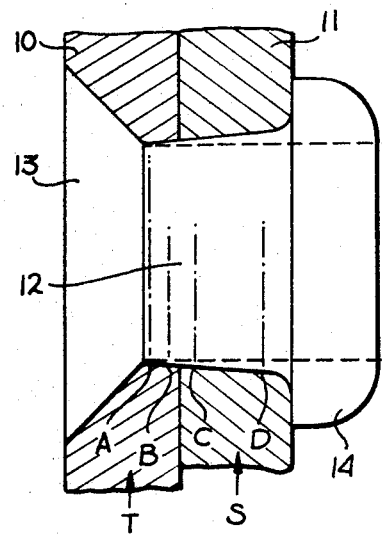
FIG. 1a is a section of a conventional rivet in a structure and illustrates the typical expansion gradient in the sheets.
Figure 1B:
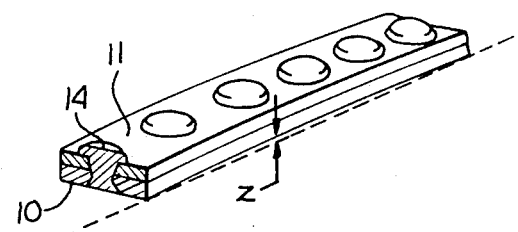

In FIG. 1a, there is illustrated a conventional, flush type rivet joint in which two sheets 10 and 11 are fastened together by rivet 12. Prior to rivet upset, the rivet has the dashed line shape and fits with slight clearance within the holes in the sheets, with the preformed rivet head 13 being flush with the surface of sheet 10. During rivet upset, the upset head 14 is formed, and at the same time, the rivet and hole are expanded into the full line shape. Location planes A, B, C, and D are indicated along the hole as shown in FIG. 1. Plane A is at the rivet shank where the manufactured head joins the shank. Planes B and C are located at close to the interface between the sheets as measurable; plane D is at the rearwardmost measurable straight surface at the upset end. These planes are planes of measurement and are located approximately as indicated. Since shank expansion in planes B and C are substantially equal, they will sometimes be collectively referred to as planes BC. To determine interference fit after rivet upset at a given upset load, the sheet is cut, the rivet is removed, and the upset shank diameter is measured in the aforesaid planes. The interference at any plane is defined as the difference between the hole diameter before upset and the rivet diameter after upset. It is apparent in FIG. 1 that the interference increases from location A to location D mainly because the upset head overexpands thereby overstressing the sheet material at location D. This undesirable condition worsens when higher strength rivets are used. Also, the greater expansion in sheet 11 produced by a number of in-line rivets, "bow distorts" the panels into an arc shape, as illustrated in FIG. 1b, in which the curvature is measured by the dimension Z. Such distortion produces residual bending stresses in the panel assembly, and results in difficulties in joining aircraft component structures.

Figure 2:
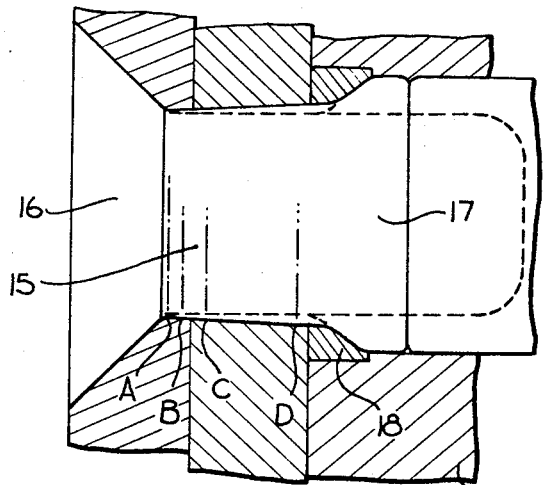
FIG. 2 is a section of an uncrowned head, rivet fastener having a collar at the upset end, and illustrates the expansion gradient in the sheets.

In FIG. 2, there is illustrated a rivet joint formed with the fastener system disclosed in U.S. Pat. No. 3,426,641. The rivet 15 has a manufactured flush head 16, and upset head 17 is shaped during upset by a collar 18 which is restrained at its outside surface by a sleeve 19. The collar causes rivet material from the upset end of the rivet to move into the hole in a controlled manner so that the expansion of the hole at location D is controlled and restrained. The dashed lines illustrate the shape of the rivet 15 and the rivet hole prior to upset and it is apparent that the utilization of the collar can produce a more uniform interference fit gradient along the rivet axis resulting in a joint having higher fatigue life than that of FIG. 1a.

Figure 3A:
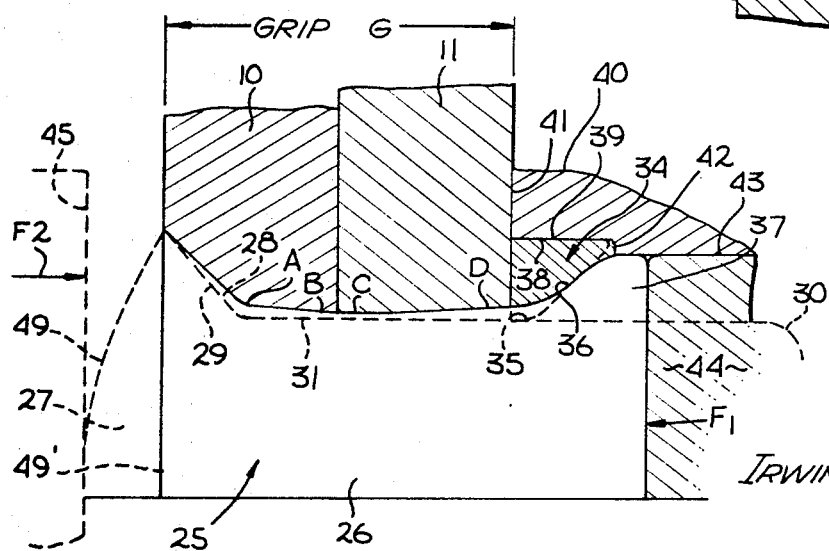
FIG. 3a is a section of a flush type, crowned head rivet fastener system of the present invention illustrating a shape of a rivet and hole before and after upset.

A rivet fastener system capable of producing substantially equal expansion at both the upset end and the manufactured head end is illustrated in FIG. 3a. The full lines illustrate the shape of the rivet and holes after upset and the dashed lines illustrate the shape of the rivet shank and hole before upset. The rivet 25 is manufactured with a straight shank 26 and a crown shaped manufactured head 27 having countersunk surface 29 which matches the countersunk surface portion 28 of the hole in panel 10. A forming collar or die 34 is placed around the shank end 30 and adjacent the surface of panel 11. The collar has an opening 35 which is substantially the same size as the hole in panel 11 and receives the rivet shank end 30. The inner surface 36 of the collar is engaged by and shapes the shank during upset of the rivet to produce the upset head 37. Different shapes may be used depending on the formability of the rivet material and the degree of tensile strength required of the upset head. During upset, the outer surface 38 of the collar is restrained by a surface 39 of a sleeve 40 which has its end 41 in abutment with the outer surface of panel 11. The sleeve has a step surface 42 which confines the collar adjacent the surface of panel 11 and also has an internal cylindrical surface 43 for guiding the piston 44 and for restraining the upset head 37 during upset by the piston. The forming collar 34 causes rivet material to be displaced into the hole in the sheets in order to expand the hole and, at the same time, the collar limits the amount of expansion in the outer surface portion of sheet 11 at location D. The forces $F_1$ and $F_2$ for upsetting the rivet are applied between the piston 44 and anvil 45 by any suitable riveting equipment. The manner in which the rivet is upset and the head formed is fully disclosed in U.S. Pat. No. 3,426,641. The manufactured head 27 is shaped by surface 49 to provide a volume of rivet material which can be displaced during rivet upset to produce a desired expansion at A in sheet 10, while leaving a face 49' after upset, which is essentially flat and flush with the sheet surface. The head 27 is crown shaped with the outer surface 49 being preferably spherical in shape. As later discussed, by varying the volume of the manufactured rivet head, the amount of the rivet head material which is displaced into the hole is varied as required for different grip lengths to obtain the expansion at location A to be substantially equal to that at location D.

It can therefore be seen that equal expansion at plans A and D can be obtained using a domed head of a preselected volume in conjunction with a restraining collar. The difference in expansion at mid-planes B/C from that at end planes A and D as indicated in FIG.

$3a$ varies with the degree of dome volume, upset force and sheet material thickness.

Figure 4:
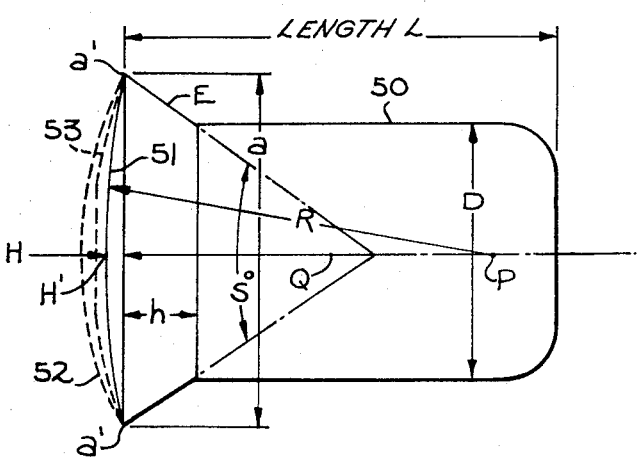
FIG. 4 is an elevational view of a flush head rivet of the present invention showing various shapes of the manufactured head.

In FIG. 4, a rivet 50 is illustrated with various crown shapes of the manufactured flush type head. The domed surface 51 is shown spherical in shape and has a radius R from the center point P which is located on the axial line Q of the rivet. The diameter of the rivet shank is designated as D, and the maximum diameter of the head is designated as $a$ and is constant for any given shank diameter. The maximum height of the crown outside the plane of diameter $a$ is designated as H and increases with the sheet thickness to be joined for optimum hole expansion. The frustro-conical countersink surface E has a countersink included angle S, illustrated at the preferred angle of 70°. For a given ratio of $H/a$, a single radius R can be determined for passing a spherical head surface through the points H′ and $a'$. The full line surface 51 indicates a low $H/a$ dome ratio whereas the dashed spherical surface 52 illustrates a higher $H/a$ ratio dome. It is understood that other crown shapes can produce the desired volume distribution. For instance, the manufactured head shape could be frustroconical, as illustrated by dashed line 53, rather than dome shaped, or conical (not shown) and still displace a predetermined volume of material into the rivet hole when the head is flattened during upset of the rivet.

Figure 5A:
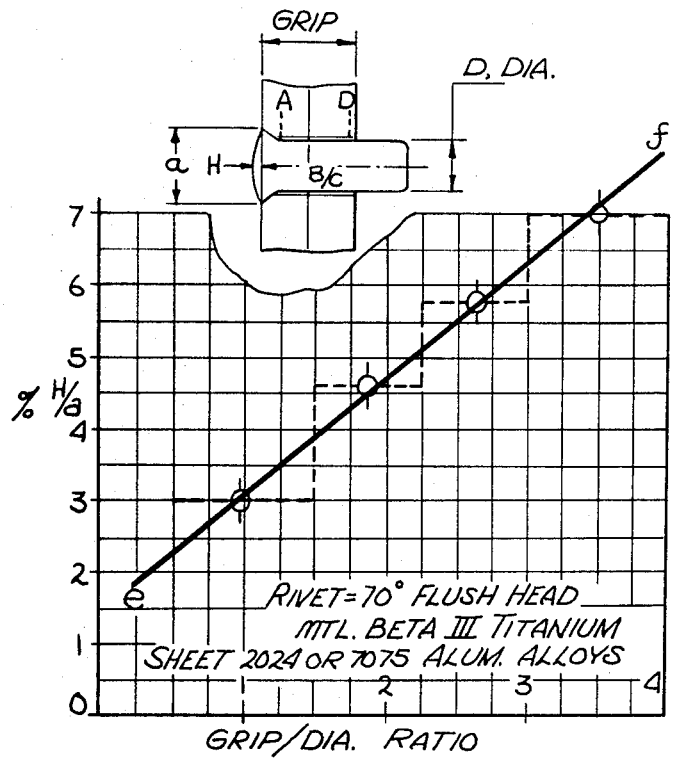
FIG. 5a is a graphical illustration showing the general relationship between the manufactured head shape of a flush type rivet and the sheet material thickness (grip)

FIG. 5a typically illustrates how dome height ratio ($H/a$) varies with grip in order to obtain optimum shank expansion at plane A, to match the expansion at plane D using collar restraint, for the rivet and sheet material combination indicated. The step graph represents the average values of $H/a$ for all of the rivet diametral sizes shown in FIG. 5f, for the grip/dia. ratios indicated. Line $e$-$f$ of FIG. 5a is a theoretical optimum curve which cannot practically be used since it would require a different dome height for every minute change in grip length. It has been found that four dome heights are generally sufficient within the grip/dia. ratios of 0.5 to 4.0. The average $H/a$ ratio is about 3 percent $H/a$ at the thin grips, increasing to about 7.0 percent at the thick grips, this grip/diameter range being that generally used in the aircraft industry.

Figure 5B:
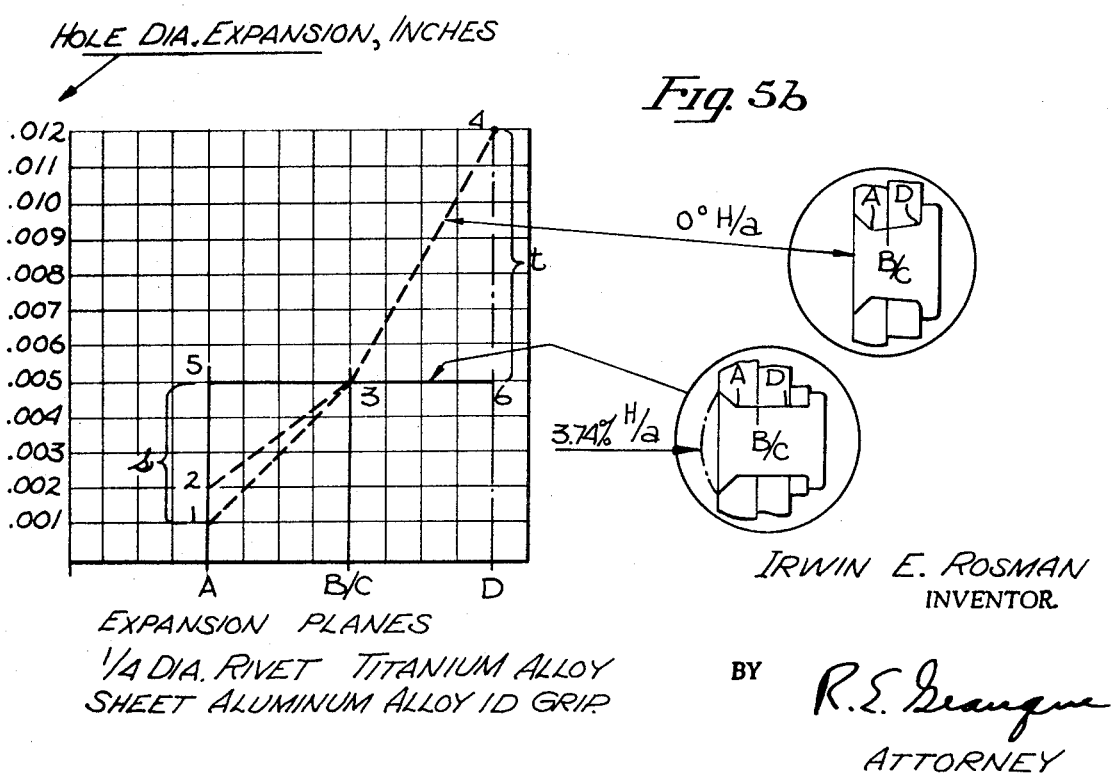
FIG. 5b is a graphical illustration comparing the hole expansion using flush head type rivets.

FIG. 5b graphically compares the expansion pattern in a structure one diameter thick (Grip = 1.0D) of the rivet joint of this invention with that of a conventional flush type rivet joint, using a flat head rivet without collar restraint at the upset head end, plane D. The optimum expansion pattern is obtained with the dome head and collar system of the present invention (3.74 percent $H/a$) and is shown by the full line 5-3-6. The expansion for the conventional flat head rivet (0 percent $H/a$) is shown by the dashed line 1-3-4, indicating that at plane A, it is too low and at plane D it is too high, denoted by the differences in expansions $s$ and $t$, respectively. This difference in interference not only results in low fatigue life but also distorts the riveted panels as illustrated by dimension Z of FIG. 1b.

Some conventional flush type rivets have low dome heights (which are constant regardless of grip length for any given shank diameter) used primarily to protect the sheet from damage by the upset anvil, while only obtaining the benefit of a slight increase in interference at plane A over that of a flat type head. Dashed line 2-3-4 indicates the expansion pattern of such a low domed rivet without a restraining collar at plane D. It can be seen that overexpansion at plane D still results, with but only slight improvement at plane A.

The optimum interference pattern for extended fatigue life occurs when the required interference values along the rivet axis are obtained while maintaining approximately equal values at planes A and D to eliminate bow distortion of the panel assembly.

The upset force applied to each of these systems was such as to give the optimum interference of 0.005 inches at the midplane BC. The deviations at planes A and D by the conventional rivet system graphically illustrates the lack of control of the interference gradient along the axis of the hole. It is understood that with the system of this invention, there is an optimum squeeze for the optimum interference required.

Typical expansion patterns using different dome height ratios in a 4D grip are shown in FIG. 5c, which graphically illustrates the importance of the increase of dome height with thicker grips. The same upset load was used in each case to control the expansion at D. The 3.74 percent $H/a$ which is optimum for the 1 D grip of FIG. 5b gives a lower, unsatisfactory expansion at location A for the 4D grip of FIG. 5c. It was therefore found necessary to increase the dome height ratio $H/a$ to 7.6 percent to produce the interference at location A equal to that at location D, resulting in an interference gradient shown by the upper curve. It can be seen that with the increase dome height of 7.6 percent $H/a$, a slightly convergent-divergent gradient from planes A to B/C to D resulted. It has been found that in certain, more limited cases, depending on the type of load transfer in the joint and the materials used for the rivet and the sheets, that a more pronounced "hour-glass" interference gradient is obtained for extended fatigue life. In these special applications, dome height ratios, $H/a$ as high as 20 percent have been used with corresponding, higher upset forces to increase the interference at planes A and D. However, for the majority of applications a more uniform interference gradient is required. Dome ratios between 2 and 8 percent have been found to be optimum, and this range will be mainly referred to in forthcoming discussions and figures.

FIG. 5d defines the protrusion of the rivet shank before rivet upset. When using rivet materials which are substantially stronger than that of the sheet, the protrusion has a secondary effect on the interference values obtained at Plane D in addition to the primary control of interference provided by the collar. It has been found that too long a protrusion will produce a lower value of interference at D. If the protrusion is too short, not only may the interference value increase beyond that desired but the resulting upset head height $h$ may fall below that preferred for adequate tensile strength. The minimum value of $h$ for this system is 40 percent of the shank diameter; this value providing tensile strength approximately equal to that obtained from the preformed protruded head of this system.

It can be seen that for all rivet shank diameters the protrusion increases with grip in order to meet the above requirement of interference control and adequate tensile strength. Since the clearance volume $c$ between the rivet shank and the drilled hole increases with the grip length, the protrusion must also increase to provide the equivalent volume of additional shank material in order to maintain the aforesaid requirements.

FIG. 5e is a tabulation of values used to graph the curves of FIG. 5d. Only the approximate grip ratios $G/D$ of 1.0 and 4.0 are shown for simplification to indicate the trend of the curves. It can be seen that the nominal protrusion ratio $P/D$ ranges from a minimum of approximately 0.9 at $G/D$ of 1.0 to a maximum of approximately 1.3 at a $G/D$ of 4.0.

FIG. 5f is a detailed tabulation showing the optimized dimensional properties of flush, domed head rivets of this invention before rivet upset. Four dome height ratios ($H/a$) and corresponding length rations ($L/D$) are shown for each basic rivet shank diameter. The $L/D$ ratios were obtained using the $G/D$ ratios and the protrusion ratios $P/D$ of FIG. 5d. It can be seen that $H/a$ increases in a step fashion and changes at the $L/D$ ratios shown. For example, a 70°, ⅜ diameter rivet will have an $H/a$ of 3.45 for all incremental rivet length ratios $L/D$, from 1.3 to 2.40. The dome ratio will increase to 4.36 for rivet length ratios between 2.41 and 3.15 and so on.

FIG. 5a previously discussed indicates the incremental step function between dome height ratio and grip/dia ratios using average values of all the shank diameters tabulated in FIG. 5f.

Figure 5H:
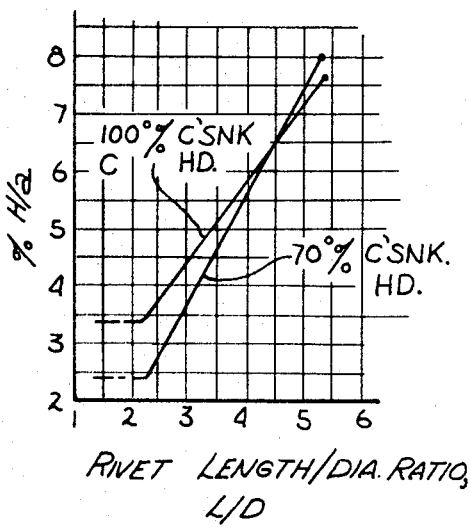
FIG. 5h is a graphical illustration showing the relationship between dome height ratio H/a and rivet length to dia ratio, L/D.
Figure 5G:
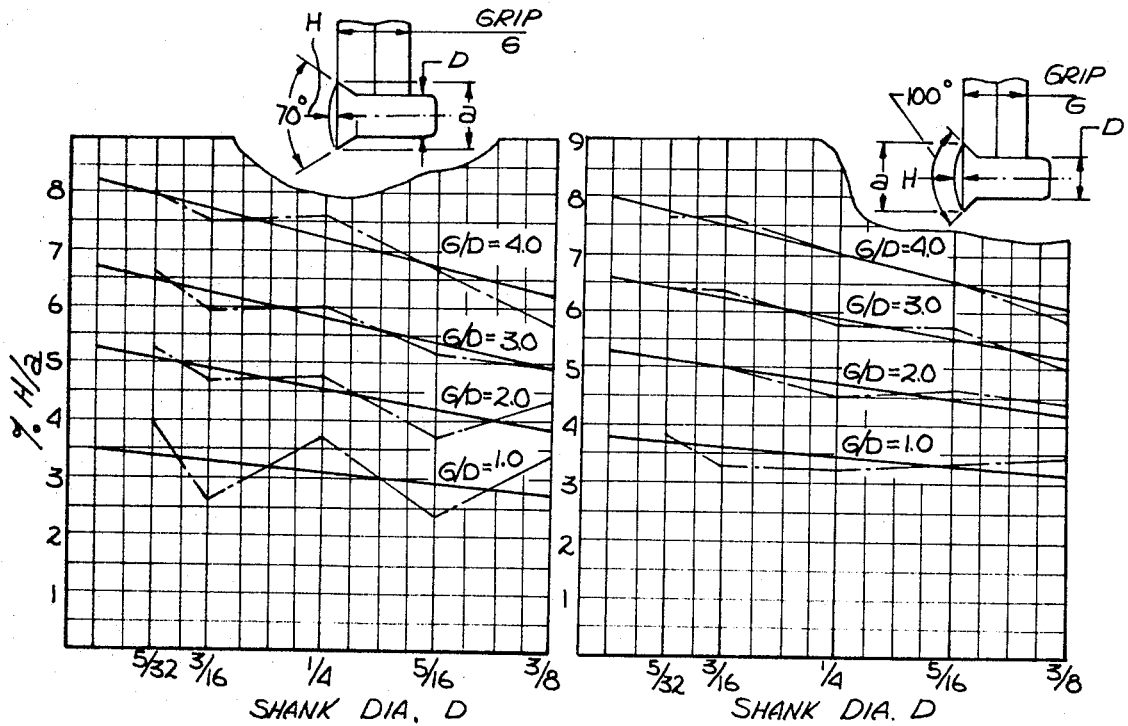
FIG. 5g is a graphical illustration showing the relationship between the manufactured head shape of a flush type rivet and sheet material thickness for different rivet shank diameters.

FIG. 5g graphically compares FIG. 5f tabulated values for the 70° and 100° type head. The solid lines represent average values for the $G/D$ values indicated, to clearly indicate the trend. It can also be seen that values of $H/a$ for both type heads are exceedingly close, and indicates that one set of $H/a$ values can be used independent of countersink angle or head diameter. It can further be seen that $H/a$ values all fall in the approximate overall range of from 2.0 to 8 percent.

FIG. 5h graphically illustrates the range of dome height ratio $H/a$ as a function of rivet length to shank diameter ratio, $L/D$. Values of $H/a$ were taken from FIG. 5f at the minimum and maximum values of $L/D$, i.e., 2.25 and 5.30. It can be seen that the maximum range of percent $H/a$ at these corresponding values of $L/D$, is from 2.4 to 8.0, as defined by the 70° type head. The values of percent $H/a$ from 3.3 to 7.6 for the 100° type head fall within the 2.4 to 8.0 percent range of the 70° head. From FIGS. 5f, 5g and 5h, it is apparent that $H/a$ variation with grip ratio or $L/D$ ratio is virtually independent of head diameter or countersink angle.

It has been found that optimum interference for fastener systems lies in the range of from 2 to 3 percent of the shank diameter $D$, depending on the amount of shear transfer from one panel to the other, through the rivet shank. For example, when aircraft skins are joined to stiffener angles (low shear transfer joint), a 2 percent $D$ interference is preferred. For lap and splice type joints (high shear transfer), 3 percent $D$ gives higher fatigue performance. This amount of interference applies when using ductile fastener materials which are stronger than the sheet materials such as ductile titanium alloy or steel fasteners in aluminum sheets, the sheet material in these cases having a relatively lower modulus of elasticity. After rivet upset, when the axial upset load is removed, the rivet elastically lengthens and diametrally reduces. The lower modulus of elasticity in the sheet causes the hole to reduce with the rivet shank diameter while still retaining a tight fit. When using rivet and sheet materials of essentially the same modulus such as aluminum rivets in aluminum sheet, or titanium rivets in titanium sheet, higher interference values are required since the diametrical springback of the hole is not as effective in maintaining a tight fit. Interference as high as 4 percent $D$ has been found required to maximize the fatigue life of joints using such equal modulus materials.

Figure 3B:
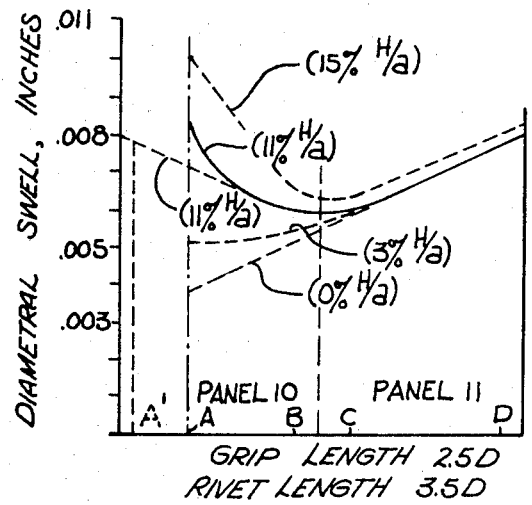
FIG. 3b is a graphical illustration of the hole swell along the axial length of an upset rivet having a pre-upset length of 3.5 times its diameter.
Figure 3C:
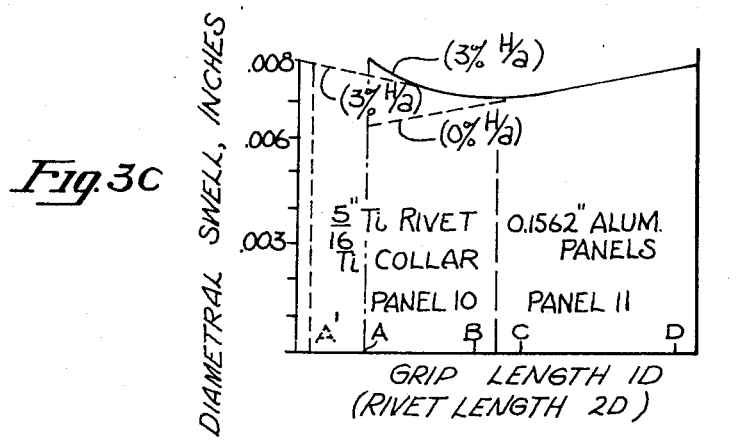
FIG. 3c is a graphical illustration of the hole swell along the axial length of an upset rivet having a pre-upset length of 2.0 times its diameter.

It has also been found that higher interference levels for extended fatigue life of aluminum structure are also required when using lower ductility rivet materials such as titanium 6 Al–4V. Results of such tests are shown in FIGS. 3b and 3c wherein higher $H/a$ dome ratios were used in conjunction with the higher upset loads required. Planes A (solid line) and A (dashed line) denote the forward planes of a flush and protruded head respectively. It can be seen that 3 percent $H/a$ for the thin grip (FIG. 3c) and 11 percent $H/a$ for the thicker grip (FIG. 3b) gave approximately the same interference in the A planes, and that a substantial increase in interference to 0.010 inches was obtained with an $H/a$ of 15 percent. It has been found the $H/a$ values as high as 20 percent can be required in thicker grips for extended fatigue life with these material systems.

Figure 6:
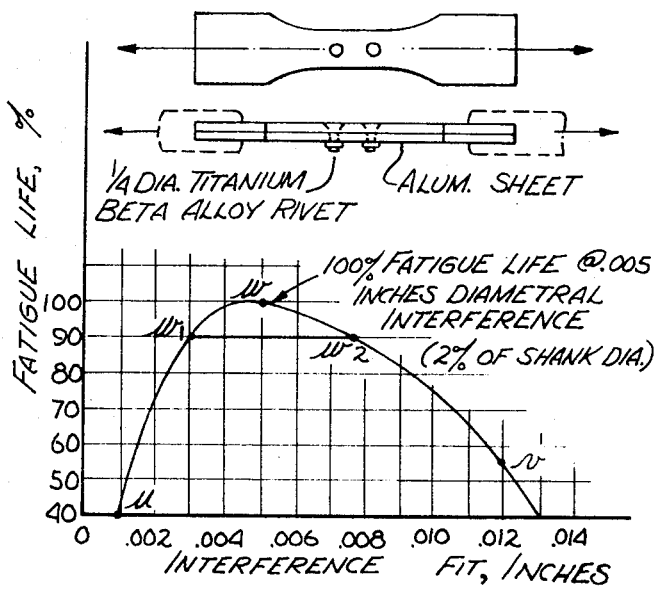
FIG. 6 graphically illustrates the variation of fatigue life with rivet interference.

For the majority of applications using the more ductile "BETA" titanium alloys such as 11.5 Mo–6.0-Zr–4.5 Sn (Beta III), uniform interference levels of approximately 2 percent of the shank diameter will result in high fatigue life as discussed in FIG. 6.

FIG. 6 shows the result of testing a lower shear transfer joint, and illustrates how fatigue life varies with interference level. Referring briefly to FIG. 5b, the interference pattern of the conventional rivet shown by line 1-3-4 indicates 0.001 inches at A and 0.012 at D. These locations would only have 40 percent and 55 percent of optimum fatigue life, respectively, as indicated by points $a$ and $v$, respectively, FIG. 6. It can be seen from FIG. 6 that the optimum interference for a ¼ diameter rivet in a low shear transfer application is 0.005 inches, (2 percent D) as shown by point $w$. The optimum range $w_1$ to $w_2$, that which will give 90° maximum fatigue life, denotes an interference range of approximately 0.003 to 0.0075 inches, respectively. Referring briefly to FIG. 5e, it can further be seen that the upper curve lies within the optimum interference range of 0.003 to 0.0075 inches for a ¼ inch shank diameter. Variation of interference fit within these values are considered to produce a substantially uniform gradient provided that the interference at planes A and D are substantially equal. These conditions have been obtained in FIGS. 5b and 5c with the fastener of this invention.

FIG. 7 illustrates a protruded head rivet 56 having a preferred spherical crown shape 54, shown above the centerline, although other crown shapes, such as the frustro-conical shape 55 shown below the centerline having essentially the same volume distribution, can be used. The symbols H, H', $a$ and $a'$ have the same meaning as defined in FIG. 4 for a flush type head. Similar to the flush head rivets, dome height ration $H/a$ for the protruded head is an important parameter in producing proper hole expansion at plane A. It has been found that dome height ratios for the protruded head rivet also can vary with rivet length to produce an optimum interference pattern as in the case of the flush type head. Similarly it was found that in certain cases protruded head dome height ratios as high as 20 percent were found to be required. For example in obtaining high interference fits above 3 percent D when using like rivet and sheet materials having high grip/diameter ratios or where lower ductility rivets are used. However, because there is no flushness requirement for protruded heads, as in the use of a flush head type rivet, a fixed configuration head for a given shank diameter, independent of grip length, was found to be feasible provided that particular, corresponding values of $H/J$ are used. For the majority of applications, the protruded dome height ratios $H/a$ in the range of 4 to 8.5 percent are preferred for the uniform gradient and optimum interference fit. In those certain cases where higher interference is required and a more "hour-glass" gradient is desired, a dome height ratio up to 20 percent can be used with corresponding increase in upset load; this will substantially increase the interference at planes A and D over that at midplanes B/C. It can be seen that for any given shank diameter, there is a dome height ratio, percent $H/a$, and a corresponding value of $H/J$ to achieve the required hole expansion at plane A substantially equal to that at plane D independent of grip length. It can be seen from the curves of FIG. 7 that $H/a$ values of from 4 to 8.5 percent can be used with corresponding values of $H/J$ of from 20 percent to 27 percent, and that the cylindrical height K of head material is interrelated with the dome height $H$.

FIG. 8 is a tabulation of the values used for the curves of FIG. 7 and shows for each shank diameter the individual head height $J$, the dome height $H$, and the head diameter $a$. It can be seen that a head diameter to shank diameter ratio $a/D$, of approximately 1.53 was used in all cases.

FIG. 9a is a combination of a flush head rivet (above the center line) and a protruded head rivet (below the center line) of the present invention, before rivet upset. The basic method in which the rivet and collar system is upset to effect the joint has been discussed in the aforesaid U.S. Pat. No. 3,426,641. The basic riveting cycle will be repeated briefly here with improved methods and preferred rivet and collar configurations, all of which improves the performance of the riveted joint. Flush head rivet 80 is inserted in the holes of sheets 10 and 11. Collar 83 is assembled around the rivet shank and held near sheet 11 by the force $F_3$ exerted on sleeve 40. Head anvil 81 exerts an opposite force $F_4$ on the dome surface 69a of the rivet. Forces $F_3$ and $F_4$ are opposing pre-clamp forces which compress the sheets together, precluding gap therebetween and in addition, cause the head fillet radius to coin either a sharp corner or smaller radius corner which is previously machined into the countersink of sheet 10 at location 60. The fatigue life of the sheet in the fillet region is substantially improved as a result of such cold working. The rivet material in this case is harder than that of the sheet; for example, the assembly of BETA titanium alloy rivets having 95,000 PSI shear strength into softer 2024 or 7075 series aluminum sheet. The preferred countersink angle S of the head for such stronger rivet materials is 70° included angle which is the same as that of the sheet. The preferred configuration of collar 83 is of a simple rectangular shape (as disclosed in copending application Ser. No. 47,825 filed June 19, 1970, by the same inventor) to permit reversible installation, thereby eliminating special orientation requirements during assembly. Such a collar shape is preferred whenever the ductility of the rivet permits forming of the upset head without cracking, and when higher tensile load capability of the joint is required. The angular type orifice collar 34 of FIG. 3 would be used to permit easier forming of the upset head with low ductility rivet materials. The collar 83 of FIG. 9a is peripherally restrained at its outer surface 77 by surface 78 of sleeve 40 to control the expansion of the shank and hole diameter at the upset head end.

It has been found that the 70° head angle gives better flow of dome material, permits a lighter weight rivet, and produces higher fatigue life in the structural joint than the 100° head. An important improvement of this invention combines the 70° head with a dome configuration which when flattened flush with the sheet surface under rivet upset forces, cause the 70° head angle to change substantially and to cold work the sheet countersink angle. This pre-upset 70° angle can decrease to as low as approximately 60° depending on the initial dome height. This change in countersink angle is graphically shown in FIG. 9d wherein the dashed line KL (70° included angle) before upset changes to the 60°–65° line MN after upset. FIG. 9d also indicates the line XL which defines countersink surface 84 of a 100° conventional type rivet head. It has been found that the tensile strength of a 70° head configuration is essentially equal to that of a 100° head having the same root thickness QL. Furthermore, if the root thickness of the 70° head is held between approximately 25 to 30 percent of the shank diameter, then adequate bearing projection height QK can be obtained in the countersink of conventional aluminum sheet materials to resist the design tensile loads of the joint.

The protruded head rivet 85 in FIG. 9a (below the center line) and collar 83 are assembled and the joint is preclamped as was done with the flush head rivet 80 of FIG. 9a previously described. The corner of the sheet is similarly coined by the fillet 79 of the protruded head rivet 85. The head anvil 82 has a preferred recess height Y, between surfaces 64 and 65, which limits the amount of dome flattening under rivet upset.

FIG. 9b is a combination view of the flush and protruded head rivets previously shown in FIG. 9a, but in the upset condition, after application and removal of force $F_6$ of the head anvil 81 or 82 and force $F_5$ of piston 41. The flush head anvil 81 has a surface 63 which is preferably curved, having a 10 to 20 inch radius, such radiused surface contacting the sheet surface 67 near the periphery of the rivet head, and causing the rivet head surface 69b to fall below the plane of the sheet surface 67 at the rivet axis. This controls the flushness of the rivet after the force $F_6$ is removed and the rivet elastically springs back (as shown). This radius permits the flushness requirement to be met for all rivet sizes ranging from 5/32 to three-eighths inches in diameter.

It can be seen that the recess of the protruded head anvil 82 can limit the upset height of the manufactured head to the amount Y if the loads are such to cause surface 65 to stop against surface 66 of the sheet. At the lower upset loads associated with thin grips, surface 65 is not engaged and the dome flattening is a function of the upset load only. At the higher upset loads, and using the conventional head anvil 86 of FIG. 9c, the manufactured head could be forced substantially into the surface of soft conventional sheet materials by a distance AA. This may be undesirable as it could result in sheet cracking, stress corrosion cracking or high sheet distortion. To prevent this condition, it has been found that the upset height, Y, should be limited to a distance of approximately 0.2 to 0.3 of the shank diameter. The head anvil 82 of FIG. 9b is of unit construction, and is for use with large stationary type riveters wherein the axis of anvil 82 and piston 41 are maintained coaxial and perpendicular to the plane of the sheet. However, when using portable squeeze riveting equipment, in order to insure that upset tooling axes are coaxial with the rivet axis and perpendicular to the sheets so that the proper joint can be made, a special head die assembly of FIG. 10 is used. This assembly consists of a sleeve 70 with an inside surface 87 having a close clearance fit with the rivet head outside diameter. When the squeezer 100 is similarly located on the collar surface 78, as shown in FIG. 11, proper orientation of the squeezer is achieved prior to and during rivet upset. It can further be seen from FIG. 10 that before upset (above the center line) the sleeve is held against the sheet by pressure from spring 88. After upset (shown below the center line), surface 74 of anvil 71 stops against surface 73 of sleeve 70 to obtain the limit distance Y so as to achieve the same control height as the one piece anvil 82 of FIG. 9b. It has been found extremely difficult to use the one piece anvil 82 to orientate the portable squeezer, as there is insufficient overlap of surface 65 with the rivet head before upset, as indicated by distance BB of FIG. 9a.

What is claimed is:

1. A rivet fastener system for fastening together a structure formed of a plurality of structural members having a hole therethrough comprising:
   a rivet having a preformed head of crowned configuration at one end and a shank extending through said hole, the preformed head engaging the surface on one side of said structure and the opposite end of said shank extending beyond the surface of the opposite side of said structure to provide material for an upset head;
   a forming collar located around said extending shank end of said rivet and adjacent the structure;
   a sleeve engaging the outer circumference of said collar for restraining the expansion of said outside circumference under rivet upset loads; the hoop strength of said collar being insufficient to prevent plastic radial expansion of said collar in the absence of said sleeve during upsetting of the head; and
   means operative on said preformed crowned head and on said extending shank of said rivet for applying forces on said rivet to upset the crowned volume of said head, and cause displacement of rivet material into the hole at said one side and to cause flow of rivet material into the hole at said opposite side while forming an upset head shaped by said collar, said collar controlling the induced swell of the rivet shank and the hole adjacent the upset head, the crown volume of said preformed crowned head being selected to effect hole swelling at said one side a desired amount while said structural members remain in substantially the same plane as before rivet upset, thereby producing a desired swell gradient in the hole of the structural members along the axis of the hole;
   the height of said crown along the rivet axis having a ratio to the preformed head outside diameter substantially within the range of 2 to 20 percent;
   said ratio being a function of said rivet length for a given shank diameter and for substantially equal rivet swell at each side of said structure.

2. A rivet fastener system as defined in claim 1 wherein said crown configuration is formed on a preformed, flush countersunk head, substantially all of the crown volume of said preformed crowned head being displaced into said hole at said one side and swelling said hole.

3. A rivet fastener system as defined in claim 1 wherein said crown configuration is formed on a performed, protruded head.

4. A method for fastening together a structure formed of a plurality of structural members having a hole therethrough comprising the steps of:
   selecting a crown volume for the preformed crowned head of a rivet such that the height of said crown along the rivet axis has a ratio to the preformed head outside diameter substantially within the range of 2 to 20 percent;
   said ratio being a function of rivet length for a given shank diameter and for substantially equal rivet swell at each side of said structure;
   inserting the shank of the rivet through the hole to locate said preformed head against one side of said structure with the opposite end of the shank extending beyond the opposite side of said structure;
   placing a forming collar around the extending shank end and adjacent the other side of said structure;
   restraining the outer circumference of said collar against radial expansion; and
   applying rivet upset forces to said preformed head and said extending shank end to displace rivet material from said preformed head into said hole and cause flow of rivet material into the hole at said opposite side while forming an upset head shaped by said collar and while said structural members remain in substantially the same plane as before rivet upset.

5. A method as defined in claim 4 comprising the step of:
   upsetting said rivet to cause said crowned configuration to become substantially flush with the adjacent structural surface.

6. A fastener for joining together structural members which have circular holes therein in alignment comprising:
   a rivet having a shank for insertion through said holes with the inserted end being adapted to be upset to form a head;
   a forming collar having an orifice therein terminating in an opening at its forward surface, said collar being adapted to be placed around the shank of the inserted rivet with said forward surface adjacent one of said structural members, the diameter of said opening being substantially the same as that of said shank;
   said orifice comprising an interior surface for shaping the inserted end during upset of said end to form said head;
   said collar having an outer circumferential surface shaped for receiving an external circumferential restraint resisting radial expansion of said outer surface under shank upset loads, the hoop strength of said collar being insufficient to prevent plastic radial expansion of said outer surface in the absence of said circumferential external restraint during upsetting of said head;
   the material of said collar adjacent said orifice experiencing plastic flow during upsetting of rivet material into said holes in the structural members so that after formation of said head, the opening of said orifice adjacent said one of said structural members matches the expanded hole in said structural member without substantial discontinuity therebetween;

said rivet having a manufactured preformed head with a crown configuration thereon causing rivet material of the preformed head to be displaced into said hole during rivet upset, said material displaced from said preformed head end and the rivet material upset into said hole from said opposite upset head end during rivet upset producing a swell gradient along said hole while said structural members remain in substantially the same plane as before rivet upset;

the height of said crown along the rivet axis having a ratio to the preformed head outside diameter substantially within the range of 2 to 20 percent;

said ratio being a function of said rivet length for a given shank diameter and for substantially equal rivet swell at each side of said structure.

7. A fastener as defined in claim 6 wherein said crown configuration is formed on a preformed, flush countersunk head, substantially all of the crown volume of said preformed crowned head being displaced upon rivet upset to be flush with the surface of the adjacent structural member.

8. A fastener as defined in claim 6 wherein said crown configuration is formed on a preformed, protruded head.

9. A rivet fastener system as defined in claim 2 wherein said preformed rivet head has a root thickness in the approximate range of 25 to 30 percent of the shank diameter.

10. In a rivet fastener system for joining a structure formed of a plurality of structural members having a circular hole therethrough comprising:
    a flush type rivet having a preformed, countersunk head at one end and a shank extending from said preformed head, said preformed head engaging a matching countersunk surface on one side of said structure and said shank extending through said hole and beyond the opposite side of said structure to provide material for an upset head;
    a forming collar having an orifice therein terminating in an opening at its forward surface, said collar being adapted to be placed around said shank with said forward surface adjacent said opposite side of said structure, the diameter of said opening being substantially the same as that of said shank;
    said orifice comprising an interior surface for shaping the end of said shank opposite said preformed head during upset of said end to form said upset head, said collar having an outer circumferential surface shaped for receiving an external circumferential restraint resisting radial expansion of said outer surface under shank upset loads;
    a sleeve engaging said outer circumferential surface of said collar to provide said circumferential restraint;
    the hoop strength of said collar being insufficient to prevent plastic radial expansion of said collar in the absence of said sleeve during upsetting of the head;
    a crown configuration on said preformed head extending from the head outside diameter and having a crown volume substantially all of which is upset into countersunk end of said hole during rivet upset, the height ($H$) of said crown along the rivet axis having a ratio to said head outside diameter ($a$) within the approximate range of 2 to 8 percent for rivets having a length to shank diameter ratio $L/D$, within the approximate range of 1.3 to 5.3;
    means operative on said preformed crowned head and on said extending shank end of said rivet to upset said crown volume into said hole and cause flow of shank rivet material into said hole while forming said upset head shaped by said collar;
    the crown material displaced into said countersunk end of said hole and the rivet material upset into said hole from said upset head end during rivet upset producing a desired interference along said hole;
    said $H/a$ ratio increasing with rivet length for a given shank diameter and for substantially equal rivet swell at each side of said structure after rivet upset.

11. In a rivet fastener system as defined in claim 10 wherein said preformed rivet head and said countersunk surface have an initial 70° countersink angle before rivet upset.

12. In a fastener system as defined in claim 10 wherein said preformed rivet head and said countersunk surface have an initial countersink angle of 100° before rivet upset.

13. In a rivet fastener system as defined in claim 10, wherein said $H/a$ ratio ranges from approximately 2.4 to 3.3 percent for rivets having a $L/D$ ratio of approximately 2.3 and below, said $H/a$ ratios increasing with $L/D$ ratio such that the $H/a$ ratio ranges from approximate 7.6 to 8.0 percent for rivets having a $L/D$ ratio of approximately 5.3.

14. In a rivet fastener system as defined in claim 10 wherein said crown configuration of said preformed head comprises a portion of a spherical surface.

15. In a rivet fastener system as defined in claim 10 wherein said preformed rivet head has a root thickness in the approximate range of 25 to 30 percent of said shank diameter.

16. A fastener for joining together a structure formed of a plurality of structural members having a hole therethrough comprising:
    a flush type rivet having a preformed, countersunk head at one end and a shank extending from said head, said preformed head engaging a matching countersunk surface on one side of said structure and said shank extending through said hole and beyond the surface of the opposite side of said structure to provide material for an upset head;
    a crown configuration on said head extending beyond the head outside diameter, and having a crown volume substantially all of which is upset into countersunk end of said hole during rivet upset, the height ($H$) of said crown along the rivet axis having a ratio to said head outside diameter ($a$) ranging from approximately 2.4 to 3.3 percent for rivets having a length to shank diameter ratio $L/D$ of approximately 2.3 and below; said $H/a$ ratios increasing with $L/D$ ratio such that the $H/a$ ratio ranges from approximately 7.6 to 8.0 percent for rivets having an $L/D$ ratio of approximately 5.3;
    said $H/a$ ratio increasing with rivet length for a given shank diameter.

17. A rivet fastener system as defined in claim 16 wherein said preformed rivet head has a root thickness in the approximate range of 25 to 30 percent of the shank diameter.

18. A rivet as defined in claim 16 wherein said rivet manufactured head has a 70° countersink angle which changes and cold works the matching countersunk surface as the crown volume is displaced under rivet upset forces to be flush with said one side.

19. A rivet as defined in claim 17 wherein said rivet manufactured head has a 100° countersink angle which changes and cold works the matching countersunk surface as the crown volume is displaced under rivet upset forces to be flush with said one side.

20. In a rivet fastener system for joining a structure formed of a plurality of structural members having a circular hole therethrough comprising:
   a rivet having a preformed, protruded head at one end and a shank extending from said head, said preformed head having a flat surface engaging one side of said structure and said shank extending through said hole and beyond the opposite side of said structure to provide material for an upset head;
   a forming collar having an orifice therein terminating in an opening at its forward surface, said collar being adapted to be placed around said shank with said forward surface adjacent said opposite side of said structure, the diameter of said opening being substantially the same as that of said shank;
   said orifice comprising an interior surface for shaping the end of said shank opposite said preformed head during upset of said end to form said upset head, said collar having an outer circumferential surface shaped for receiving an external circumferential surface shaped for receiving an external circumferential restraint resisting radial expansion of said outer surface under shank upset loads;
   a sleeve engaging said outer circumferential surface of said collar to provide said circumferential restraint;
   the hoop strength of said collar being insufficient to prevent plastic radial expansion of said collar in the absence of said sleeve during upsetting of the head;
   a crown configuration on said preformed head extending beyond the head outside diameter, the height of said crown along the rivet axis having a ratio to said preformed head outside diameter ($H/a$) within the approximate range of 4 to 8.5 percent for rivets having a ratio of crown height to total head height ($H/J$) within the approximate range of 20 to 27 percent;
   means operative on said preformed crowned head and on said extending shank end of said rivet to upset said crown volume into said hole and cause flow of shank rivet material into said hole while forming said upset head shaped by said collar;
   the rivet head material displaced into said hole and the rivet material upset into said hole from said upset head end during rivet upset producing a desired interference along said hole;
   said $H/a$ and $H/J$ ratios being substantially independent of rivet grip length ($G$) for a given shank diameter and for producing approximately equal hole swell at each side of said structure.

21. In a rivet fastener system as defined in claim 20 wherein each $H/a$ value has a corresponding $H/J$ value within said ratios.

22. In a rivet fastener system as defined in claim 20, the largest values of $H/a$ and $H/J$ being associated with rivets of approximately one-eighth inch shank diameter and the smallest values of $H/a$ and $H/J$ being associated with rivets of approximately three-eighths inch shank diameter, both said $H/a$ ratio and $H/J$ ratio decreasing as rivet shank diameter increases.

23. In a rivet fastener system as defined in claim 20 wherein said crown configuration of said preformed head comprises a portion of a spherical surface.

24. A fastener for joining together a structure formed of a plurality of structural members having a hole therethrough comprising:
   a rivet having a preformed, protruded head at one end and a shank extending from said head, said preformed head having a flat surface engaging one side of said structure and said shank extending through said hole and beyond the opposite side of said structure to provide material for an upset head;
   a crown configuration on said preformed head extending beyond the head outside diameter, the height of said crown along the rivet axis having a ratio to said preformed head outside diameter ($H/a$) within the approximate range of 4 to 8.5 percent for rivets having a ratio of crown height to total head height ($H/J$) within the approximate range of 20 to 27 percent, the largest values of $H/a$ and $H/J$ being associated with rivets of approximately one-eighth inch shank diameter and the smallest values of $H/a$ and $H/J$ being associated with rivets of approximately three-eighths inch shank diameter, both said $H/a$ ratio and $H/J$ ratio decreasing as rivet shank diameter increases;
   said $H/a$ and $H/J$ ratios being subStantially independent of rivet grip length ($G$) for a given shank diameter.

25. A rivet fastener system as defined in claim 10 wherein said rivet shank having a pre-upset protrusion to shank diameter ratio ($P/D$) within the approximate range of 0.9 to 1.3 so that after rivet upset the upset head height ($h$) above the adjacent structure surface does not fall below 40 percent of the shank diameter ($D$).

26. A rivet fastener system as defined in claim 20 wherein said rivet shank having a pre-upset protrusion to shank diameter ratio ($P/D$) within the approximate range of 0.9 to 1.3 so that after rivet upset the upset head height ($h$) above the adjacent structure surface does not fall below 40 percent of the shank diameter ($D$).

27. A fastener as defined in claim 6 wherein
   said rivet is of the flush type having a preformed, countersunk head at one end engaging a matching countersink surface on one side of said structure;
   said ratio ($H/a$) ranging from approximately 2.4 to 3.3 percent for rivets having a length to shank diameter ratio $L/D$ of approximately 2.3 and below, said $H/a$ ratios increasing with $L/D$ ratio such that the $H/a$ ratio ranges from approximately 7.6 to 8.0 percent for rivets having a $L/D$ ratio of approximately 5.3.

28. A fastener as defined in claim 6 wherein
   said rivet is of the preformed, protruded head type having a flat surface engaging one side of said structure, the largest values of $H/a$ and $H/J$ being associated with rivets of approximately $H/a$ inch shank diameter and the smallest values of $Ha$ and $H/J$ being associated with rivets of approximately three-eighths inch shank diameter, both said $H/a$ ratio and $H/J$ ratio decreasing as rivet shank diameter increases, both said $H/a$ ratio and said $H/J$ ratio decreasing as rivet shank diameter increases.

29. A method as defined in claim 4 comprising the step of
upsetting said rivet to cause said crown configuration to assume an inwardly curved surface having a radius in the approximate range of 10 to 20 inches.

30. A method as defined in claim 4 including the step of limiting the application of rivet upset forces to limit the amount of the preformed head displaced into said hole.

31. A method as defined in claim 30 wherein the limiting of the upset forces limits the upset height of the head above the adjacent structural surface to the approximate range of 0.20 to 0.30 times the shank diameter.

32. The method as defined in claim 31 wherein the limiting of the upset forces results from spacing the application of upset force from its adjacent structural surface.

* * * * *